US012680622B2

(12) United States Patent
Woerner et al.

(10) Patent No.: US 12,680,622 B2
(45) Date of Patent: Jul. 14, 2026

(54) ELECTROMAGNETIC ACTUATOR

(71) Applicant: Knorr-Bremse Systeme Fuer Nutzfahrzeuge GmbH, Munich (DE)

(72) Inventors: Ralf Woerner, Tiefenbronn (DE); Friedbert Roether, Cleebronn (DE); Benjamin Jensen, Grossbottwar (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 63 days.

(21) Appl. No.: 18/714,909

(22) PCT Filed: Dec. 14, 2022

(86) PCT No.: PCT/EP2022/085922
§ 371 (c)(1),
(2) Date: May 30, 2024

(87) PCT Pub. No.: WO2023/111057
PCT Pub. Date: Jun. 22, 2023

(65) Prior Publication Data
US 2025/0027576 A1      Jan. 23, 2025

(30) Foreign Application Priority Data

Dec. 15, 2021   (DE) ..................... 10 2021 133 242.7

(51) Int. Cl.
*F16K 31/06*      (2006.01)
*B60T 13/68*      (2006.01)
(52) U.S. Cl.
CPC .......... *F16K 31/0682* (2013.01); *B60T 13/68* (2013.01); *F16K 2200/3051* (2021.08)
(58) Field of Classification Search
CPC ......... F16K 31/0682; F16K 2200/3051; F16K 1/221; F16K 1/225; F16K 1/224;
(Continued)

(56) References Cited

U.S. PATENT DOCUMENTS 4,534,381 A * 8/1985 Hozumi .............. F16K 31/0682
137/625.65
5,048,564 A * 9/1991 Gaiardo .................. F16K 47/04
137/601.15
(Continued)

FOREIGN PATENT DOCUMENTS

DE      102014115206 B3      2/2016
DE      102014115207 A1      4/2016
(Continued)

OTHER PUBLICATIONS

Machine Translation of DE 10 2014 115 206 B3 (Year: 2016).*
International Search Report for PCT/EP2022/085922, Issued Mar. 22, 2023.

*Primary Examiner* — Craig M Schneider
*Assistant Examiner* — Andrew J Rost
(74) *Attorney, Agent, or Firm* — NORTON ROSE FULBRIGHT US LLP

(57) ABSTRACT

An electromagnetic-actuator having a coil-assembly (CA) with a coil-core (CC) and a coil arranged about the CC circumference and a movable-magnetic-armature-body (MMAB) as a movable-actuator-element (MAE) which is movable by a magnetic-field generated by the CA, the AB being mounted by a bearing-assembly (BA) and movable from a first/second position. The BA has depressions in a first-bearing-section formed on the AB, the depressions being integrated into the AB and being formed in the shape of depressions mutually spaced in the direction of a bearing-axis (BA) of the AB and have an at least partly cylindrical bowl-like shape, and elevations in a second bearing-section formed on the actuator on the CA side, the elevations being formed in the shape elevations which are mutually spaced in the direction of the BA of the AB and have an at least partly cylindrical shape and each of which engages into one of the depressions.

15 Claims, 6 Drawing Sheets

(58) Field of Classification Search
    CPC . B60T 13/68; B60T 8/36; B60T 15/02; H01F
                7/121; H01F 7/081; H01F 7/14; H01F
                                            2007/086
    See application file for complete search history.

(56) References Cited

U.S. PATENT DOCUMENTS

| | | | |
|---|---|---|---|
| 5,139,226 A | | 8/1992 | Baldwin et al. |
| 6,700,232 B2 * | | 3/2004 | Rieck ................. F15B 13/0438 |
| | | | 310/34 |
| 10,024,452 B2 | | 7/2018 | Ohki |
| 2015/0187525 A1 * | | 7/2015 | Mills ..................... H01H 50/42 |
| | | | 335/203 |
| 2019/0360609 A1 * | | 11/2019 | Roether ............. F16K 31/0682 |

FOREIGN PATENT DOCUMENTS

| | | | |
|---|---|---|---|
| DE | 102016105532 A1 | 9/2017 | |
| DE | 102018123997 A1 | 4/2020 | |
| JP | S57109310 A | 7/1982 | |

* cited by examiner

ELECTROMAGNETIC ACTUATOR

FIELD OF THE INVENTION

The present invention relates to an electromagnetic actuator having a coil assembly with at least one coil core and a coil, which is arranged circumferentially around the coil core, and a movable magnetic armature body as a movable actuator element.

BACKGROUND INFORMATION

Electromagnetic actuators are understood, for example, in the form of electromagnetic switching or valve devices, e.g. in the form of an electromagnetic relay or solenoid valve. Solenoid valves, in the form of tilting armature valves for instance, are used, for example, as control valves for air pressure regulation, in a vehicle for instance, e.g. a utility vehicle or bus for passenger transport. For example, a brake system for a vehicle having an electronic service brake system comprises at least one control valve for pressure regulation.

An electromagnetic actuator in the form of a tilting armature valve is discussed in DE 10 2016 105 532 A1, for example. The electromagnetic actuator has a coil assembly with at least one coil core and a coil, which is arranged circumferentially around the coil core, and a movable magnetic armature body as an actuator element. The armature body is supported on the coil assembly via two balls, which are pressed into the armature body.

Other solenoid valves are also understood, e.g. those discussed in DE 10 2014 115 207 A1, DE 10 2018 123 997 A1, or DE 10 2014 115 206 B3.

In the case of such electromagnetic actuators, imprecise armature positions may arise in some cases in the working state, and this may lead to the support between the armature body and the coil assembly wearing more quickly.

In the case where the armature body (or armature for short) is supported in a known electromagnetic actuator by a bearing assembly, complex production is often required since mounting such a bearing assembly on the armature often requires a large number of assembly steps due to a number of elements that have to be produced independently.

SUMMARY OF THE INVENTION

An object on which the present invention is based is that of specifying an electromagnetic actuator of the type stated at the outset with which production can be simplified.

The invention relates to an electromagnetic actuator of the type stated at the outset in accordance with the descriptions herein. Advantageous embodiments and developments of the invention are specified in the further descriptions herein and the following description.

In particular, one aspect of the present invention relates to an electromagnetic actuator, having a coil assembly with at least one coil core and a coil, which is arranged circumferentially around the coil core, and a movable magnetic armature body as a movable actuator element, which can be moved by a magnetic field generated by the coil assembly. The armature body is supported by a bearing assembly and can be moved from a first position into a second position. The bearing assembly has at least two depressions in a first bearing section, which is formed on the armature body, and at least two elevations in a second bearing section, which is formed on the actuator on the same side as the coil assembly. The depressions are integrated in the armature body and are embodied in the form of at least two depressions which are arranged at a distance from one another in the direction of a bearing axis of the armature body and are of at least partly cylindrical bowl-type design. The elevations are embodied in the form of at least two elevations which are arranged at a distance from one another in the direction of the bearing axis of the armature body and are of at least partly cylindrical design and each of which engages in one of the depressions.

The electromagnetic actuator according to the invention makes it possible for the armature body to be moved securely and smoothly in the electromagnetic actuator. In the present invention, there is no need for a separate bearing element, thus reducing the number of components in the electromagnetic actuator and also facilitating assembly. Since the bearing assembly has depressions on the magnetic armature body, the bearing assembly has a positive effect on a magnetic flux in the armature body and on its kinetic effect on the armature body. Moreover, the bearing assembly allows good and accurate positioning of the armature body in the actuator element, in particular on the coil assembly. The bowl-type bearing locations, which are of mirror-image design, allow wearing of the bearing assembly in a manner which is symmetrical over the long term, and therefore the wear has a reduced effect, especially on the rotational positioning and thus the functioning of the electromagnetic actuator.

Owing to the design of the depressions as depressions which are of at least partly cylindrical bowl-type design and owing to the elevations of at least partly cylindrical design, the bearing assembly can accept high transverse forces, in particular magnetic transverse forces, even in the case of small contact forces, without the armature body becoming detached from the coil assembly. The spacing apart of the depressions along the bearing axis of the armature body allows centering by way of two closely spaced contact surfaces. This improves the precision and ability to function over the service life of the electromagnetic actuator. Moreover, manufacturing tolerances can be reduced by virtue of the integrated bearing assembly.

The elevations are arranged at a distance from one another in the direction of the bearing axis of the armature body and are of at least partly cylindrical design. In particular, the elevations are configured as a type of half cylinder, which extend on the same side as the coil assembly in the direction of the armature body.

The arrangement and shape of the elevations correspond to the arrangement and shape of the depressions in the armature body. In particular, the depressions are each provided as a depression of at least partly cylindrical design in the armature body.

The electromagnetic actuator according to the invention may be in the form of a solenoid valve, e.g. for a brake system of a vehicle, in particular a utility vehicle.

According to one embodiment of the electromagnetic actuator, one of the elevations and one of the depressions in each case are in contact at two lines of contact tangential to the respective surface and running in the direction of the bearing axis of the armature body. In particular, two spaced linear contact locations (linear contacts) are thus formed between the corresponding elevation and depression, thereby allowing precise guidance of the armature body without a large bearing play. A smaller bearing play also increases the durability of the electromagnetic actuator.

According to one embodiment of the electromagnetic actuator, the elevations and depressions, which engage in one another, have different surface radii in respective regions of the tangential lines of contact (linear contacts). This allows advantageous, reliable and play-free contacting between the corresponding elevation and depression over wide ranges of movement of the armature body. It is thereby possible to further reduce wear on the bearing assembly, thereby improving the durability of the electromagnetic actuator.

According to one embodiment of the electromagnetic actuator, the elevations are each flattened out of the cylindrical shape in a region between the tangential lines of contact (linear contacts), and are not in contact in the flattened region with the respective depression. This prevents a large bearing play since it is not the highest point of the elevation which comes into contact with the depression but two points on a circular arc with a tangential angle relative to one another. This makes the bearing assembly very largely free from play, even over the service life.

According to one embodiment of the electromagnetic actuator, at least one of the depressions is configured so that an end face of the at least one of the depressions which is closer to the respective other depression is of arched, in particular spherical, design or configured to be flattened out of the cylindrical bowl-type shape. This embodiment of the depression allows an improvement in bearing centering. It is thereby also possible to reduce the wear on the bearing assembly.

According to one embodiment of the electromagnetic actuator, bearing centering along the bearing axis is brought about by the end face of the at least one of the depressions in interaction with the respective elevation.

According to one embodiment of the electromagnetic actuator, at least one of the elevations is configured so that an end face of the at least one of the elevations which is closer to the respective other elevation is of arched, in particular spherical, design or configured to be flattened out of the cylindrical shape. This embodiment of the depression allows an improvement in bearing centering. It is thereby also possible to reduce the wear on the bearing assembly.

According to one embodiment of the electromagnetic actuator, bearing centering along the bearing axis is brought about by the end face of the at least one of the elevations in interaction with the respective depression.

According to one embodiment of the electromagnetic actuator, in the axial direction of the depressions (and therefore in the direction of the bearing axis), an axis of symmetry of the depressions is arranged below a surface of the armature body which adjoins the depressions. This means that the theoretical axis of rotation of the depressions is arranged in such a way below the armature body surface adjoining the depressions that a straight flank is formed tangentially from the cylindrical shape. An intermediate section between the surface of the armature body and the start of the cylindrical shape of the depression can therefore be of approximately rectilinear design in cross section. This allows the elevations to penetrate deeper into the armature body. The armature body is thereby prevented from popping out of the guide provided by the bearing assembly and ensures an emergency functionality, e.g. if a spring force for pressing the armature body against the second bearing section slackens or disappears.

According to one embodiment of the electromagnetic actuator, said actuator has a spring element for pressing the armature body against the second bearing section. The spring element can be configured as a leaf spring, leg spring or bent wire element. This ensures reliable support for the armature body against the coil assembly. As a result, the wear on the armature body and on the second bearing section, in particular the depressions and elevations, remains low, thereby improving the durability of the electromagnetic actuator.

According to one embodiment of the electromagnetic actuator, in the first position, the spring element presses the armature body against the second bearing section and holds it in position.

According to one embodiment of the electromagnetic actuator, said actuator furthermore has at least one supporting element, which is arranged on an opposite side of the armature body from the coil assembly, opposite the depressions, and supports the armature body when the armature body drops away from the elevations. This prevents the armature body from popping out of the guide provided by the elevations and ensures an emergency functionality, e.g. in the event that a spring element breaks or becomes detached. If there is no need for play-free support in the "dropped-out" state of the armature body, the at least one supporting element also makes it possible to dispense with a spring element (bearing spring) as described above.

According to one embodiment of the electromagnetic actuator, the elevations have a depth of penetration into the depressions which is dimensioned such that the bearing axis is arranged deeper than a surface of the armature body outside the depressions. This prevents the armature body from dropping out of the guide and prevents the armature body from slipping off or being released from the coil assembly, and an emergency functionality is ensured.

According to one embodiment of the electromagnetic actuator, the armature body is embodied as a plate armature.

According to one embodiment of the electromagnetic actuator, the electromagnetic actuator is configured as an electromagnetic switching or valve device having an armature body as a switching or valve element, in particular being configured as an electromechanical relay or solenoid valve.

According to one embodiment, the electromagnetic actuator is configured as a tilting armature valve.

According to one embodiment, the electromagnetic actuator is configured as a solenoid valve for a pressure control module in a vehicle.

The embodiments described herein can be used together or in any combination with one another.

The invention is explained in greater detail below by the figures shown in the drawing.

DETAILED DESCRIPTION

Figure 1A:
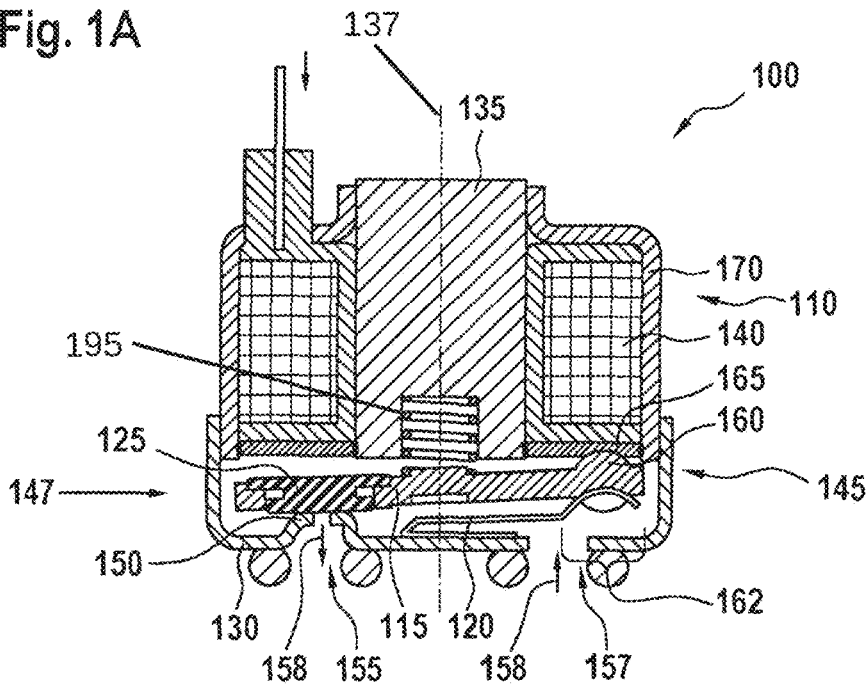
FIG. 1A shows a schematic cross-sectional illustration of an illustrative tilting armature valve, in which an electromagnetic actuator according to the invention can be used in principle.
Figure 1B:
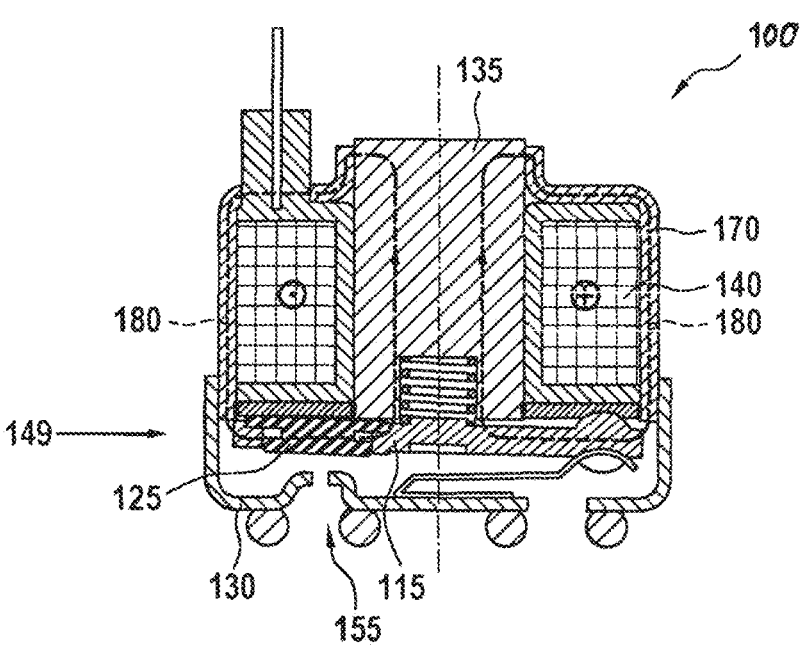
FIG. 1B shows a schematic cross-sectional illustration of an illustrative tilting armature valve, in which an electromagnetic actuator according to the invention can be used in principle.
Figure 2:
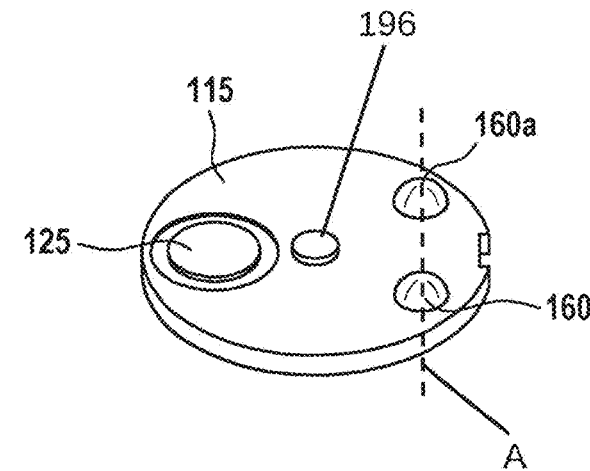
FIG. 2 shows a perspective illustration of an illustrative known armature body for use in a tilting armature valve according to FIG. 1.

FIG. 1 shows, by FIG. 1A and FIG. 1B, a simplified cross-sectional illustration of a tilting armature valve 100, in which an electromagnetic actuator 105 according to the invention, of the kind illustrated in detail views in FIGS. 3 to 6, can be used in principle. In this case, FIG. 1 is intended to illustrate an illustrative practical application of an electromagnetic actuator according to the invention with reference to a tilting armature valve. FIG. 2 shows an illustrative armature body 115, which is known from DE 10 2016 105 532 A1 and which can also be used in principle, with the exception of the support (in the region of the elevations 160, 160a) in an actuator according to the invention.

Figure 3:
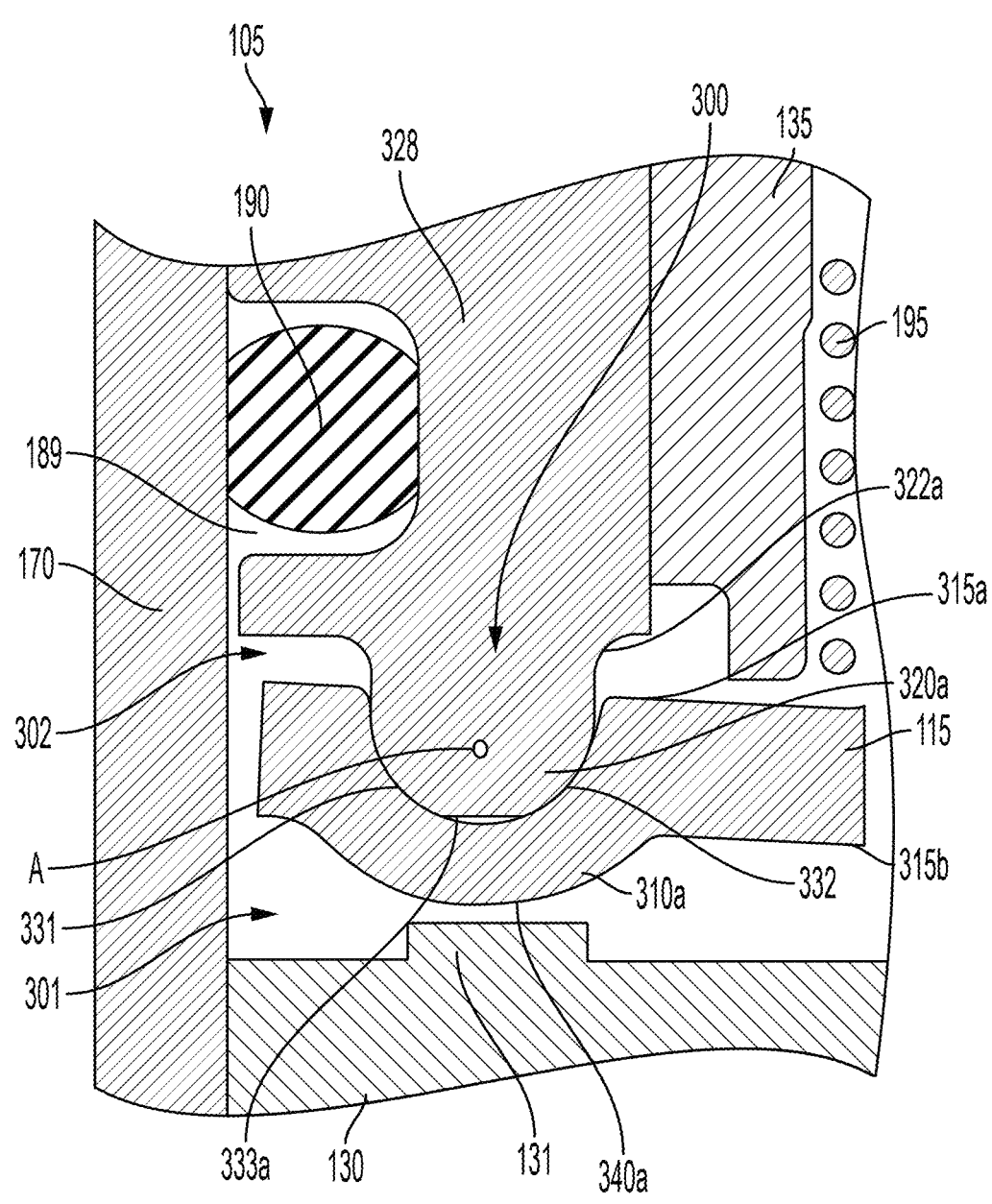
FIG. 3 shows a schematic cross-sectional illustration of one embodiment of an electromagnetic actuator according to the invention perpendicularly to a bearing axis A, of the kind that can be used, for example, in a tilting armature valve according to FIG. 1.
Figure 4:
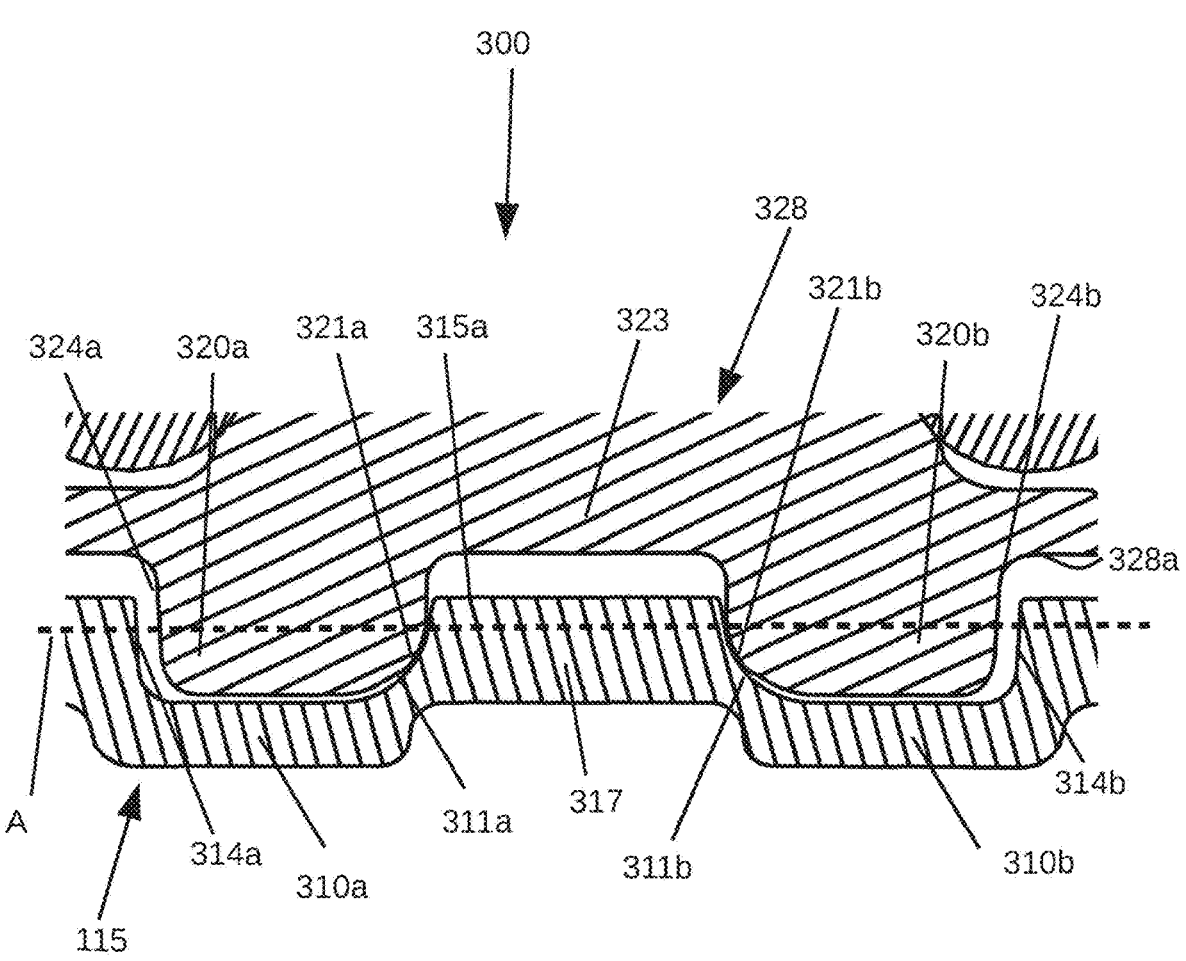
FIG. 4 shows a schematic enlarged cross-sectional illustration of a bearing assembly according to one embodiment of an electromagnetic actuator according to the invention, wherein a section plane along the bearing axis A from FIG. 3 has been chosen.
Figure 5:
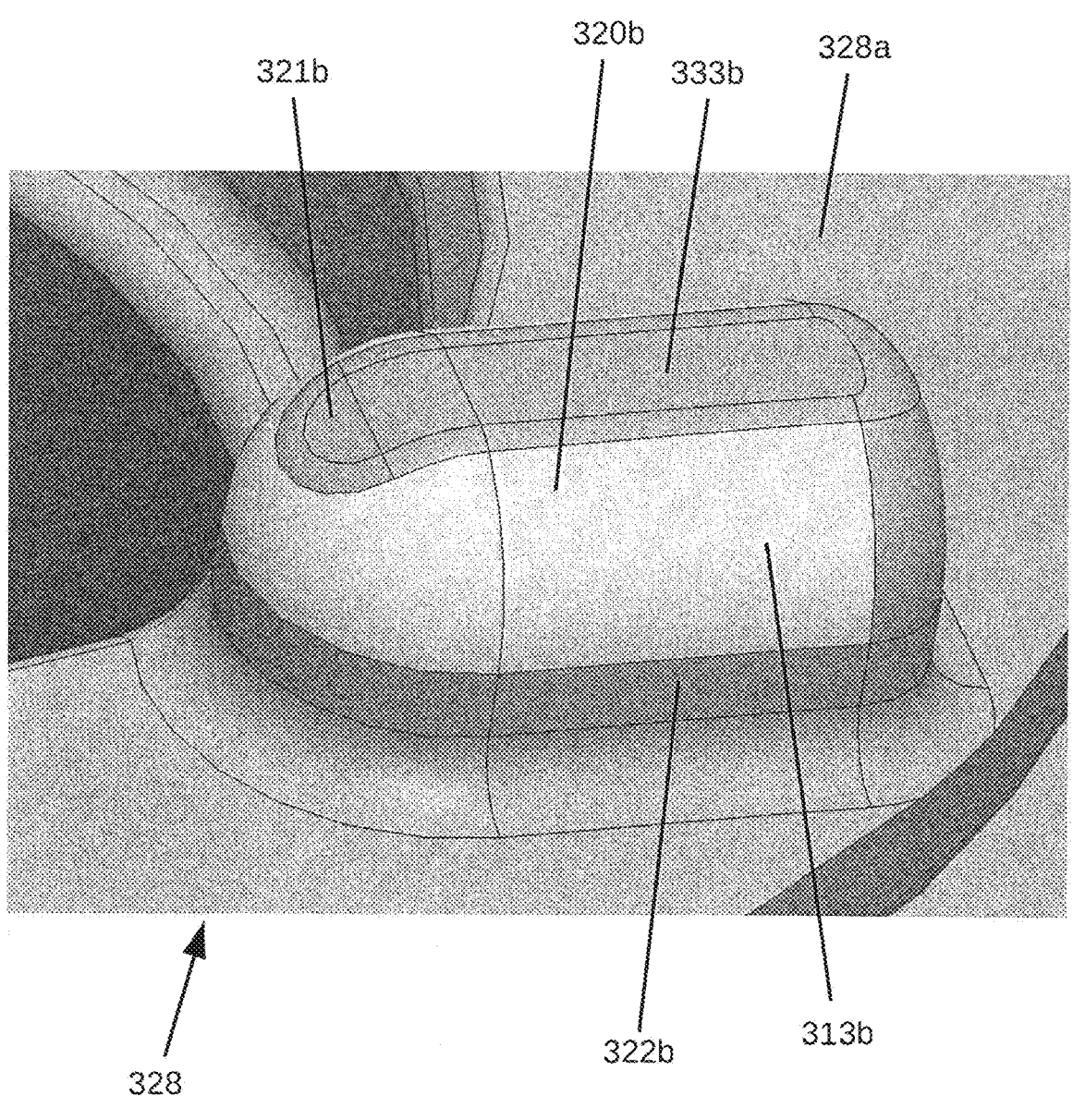
FIG. 5 shows an enlarged perspective illustration of an elevation of a bearing assembly in one embodiment of an electromagnetic actuator according to the invention.
Figure 6:
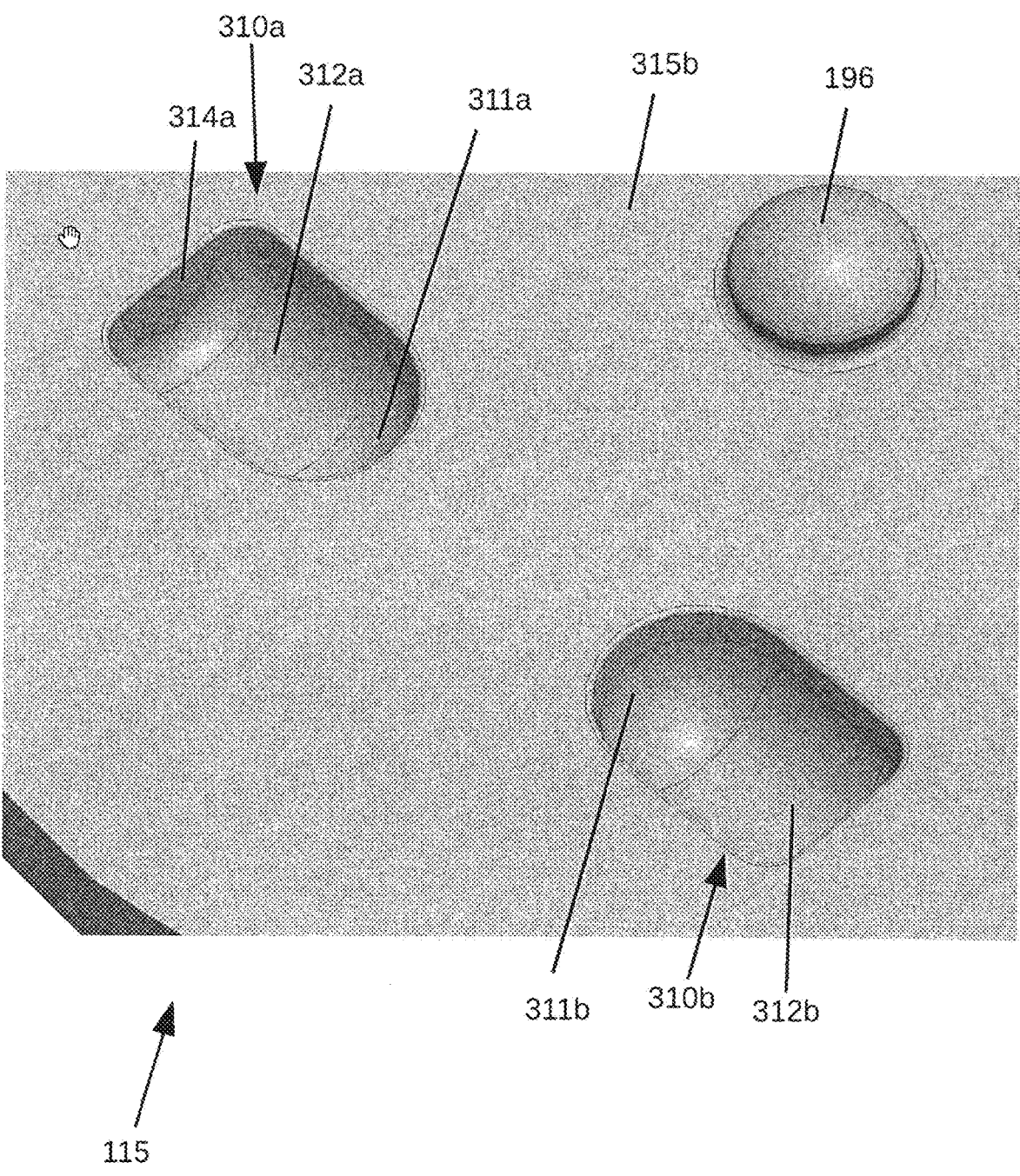
FIG. 6 shows an enlarged perspective illustration of two depressions, arranged in the armature body, of a bearing assembly in one embodiment of an electromagnetic actuator according to the invention.

The configuration according to the invention of the armature body 115 is illustrated in greater detail in FIGS. 3, 4 and 6, and the configuration according to the invention of a coil former 320 is illustrated in greater detail in FIGS. 3, 4 and 5, using an exemplary embodiment, and can in principle be applied readily to a tilting armature valve according to FIG. 1 and an armature body according to FIG. 2 by a person skilled in the art. In this context, attention is drawn to the fact that the fundamental mode of operation of electromagnetic devices, such as switching or valve devices having an armature body that can be moved by a magnetic field as a switching or valve element, is known to a person skilled in the art.

In principle, the tilting armature valve 100 can be an exemplary embodiment of a tilting armature valve 100 shown in DE 10 2016 105 532 A1. In one variant, this can be a solenoid valve provided with the reference sign 100 in FIG. 1 there. However, other exemplary embodiments are also conceivable, e.g. in connection with solenoid valves such as those described in the other publications mentioned above. Such embodiments of a solenoid valve described in DE 10 2016 105 532 A1 and the components thereof, and their use, are also incorporated by reference into the disclosure of the present invention.

FIG. 1A shows a cross section through a tilting armature valve 100, in which the armature is in the first position. The tilting armature valve 100 has a coil element 110, an armature body (or armature for short) 115, a spring 120, a sealing element 125, and a cover shell 130. In this case, the coil element 110 comprises at least one coil core 135, which is aligned along a longitudinal axis 137, a coil former 128 arranged circumferentially around the coil core 135, and a coil 140 arranged circumferentially around the coil former 128 and having a pack of coil windings (not illustrated explicitly). One end of the armature 115 is supported by a bearing 145. The armature 115 can be moved between a first position 147 and a second position 149. In this case, the armature 115 is configured to be moved from the first position 147 into a second (attracted) position 149 when the coil 140 is activated. When the coil 140 is activated, the armature 115 can be held in the second position 149. The sealing element 125 is furthermore arranged on the side of the armature 115 facing away from the coil element 110. A valve seat 150 having an outlet 155 and an inlet 157 for a fluid 158 is formed in the cover shell 130. In this case, the outlet 155 can be closed in a fluidtight manner by the sealing element 125 when the armature 115 is arranged in the first position 147. In this context, the sealing element 125 can furthermore also act as a damper element in order to prevent the armature 115 from banging into the valve seat 150. In this arrangement, the sealing element 125 can be secured on the armature 115 or a carrier element by vulcanization. It is furthermore conceivable for an angle to be formed by an oblique nozzle or an obliquely shaped sealing element 125 or a curved armature 115 when the armature 115 or sealing element 125 strikes the valve seat 150. Such a nozzle is not illustrated explicitly in FIG. 1A and does not necessarily have to be integrated into the tilting armature valve 100, but can also be provided by external housing parts.

It is furthermore conceivable that the valve seat 150 is arranged in the coil element 110, but this is not illustrated explicitly in FIG. 1A for reasons of clarity. In this case, an actuator that brought about exposure of the outlet by the armature 115 would be advantageous.

In this exemplary embodiment, the armature 115 has at least one at least partially round elevation 160 in a bearing section 162, wherein the elevation 160 engages in a recess 165 or opening, which is arranged in a section of a housing 170 of the tilting armature valve 100 which lies opposite the elevation 160. As a result, the armature 115 can slide in the recess during a movement from the first position 147 into the second position 149 after a flow of current through the coil 140 has been switched on, and it is simultaneously held at a fixed position in the housing 170 or in relation to the cover shell 130. The recess is of trapezoidal configuration, and therefore the minimum possible friction is caused as the elevation slides across the surface of the recess 165. The recess 165 can be manufactured from a plastics material, for example.

In this example, the spring 120 is configured as a leaf spring and is arranged in the bearing section on an opposite side of the armature 115 from the coil 140. Here, the spring 120 serves to press the bearing ball(s), which is (are) press-fitted in the armature 115 for example, without play into the (e.g. trapezoidal) mating shell or recess 165 in the housing 170 of the coil element 110. The armature 115 can be fixed by the spring 120, thus ensuring that the armature 115 is held in a predetermined position by the spring 120. This offers the advantage that a constant preloading force can be exerted on the armature 115, and the force exerted on the armature 115 by the spring 120 can be introduced into the armature 115 as close as possible to a point of action of the force situated at the bearing axis.

Alternatively, it is also possible for the armature 115 to be hooked into the coil element 110. In this case, the spring 120, which is configured as a leaf spring for example, could then be omitted.

FIG. 1B shows a cross section through a tilting armature valve 100, in which the armature 115 is in the second position 149. In this case, a current through the coil 140 is switched on, and the armature 115 is attracted, with the result that a magnetic field illustrated by the field lines 180 is built up. When the current through the coil 140 is switched off, the armature 115 can fall back into the first position 147 owing to gravity or a spring force of an illustrated return spring 195, for example.

FIG. 2 shows a perspective illustration of the illustrative armature 115, which is also known from DE 10 2016 105 532 A1, for use in the tilting armature valve 100. Here, the armature 115 is configured as a plate armature. In addition to the sealing element 125, the armature 115 has two press-fitted balls as elevations 160, 160a, which are arranged in a direction which forms a bearing axis of the armature 115 during rotation after the current through the coil 140 is switched on. This means that the elevations 160 and 160a are arranged next to one another along the bearing axis A. Formed centrally on the armature 115 is a spring fastening section 196, which interacts with the return spring 195 and prevents the return spring 195 from slipping off the armature 115.

FIG. 3 shows a schematic cross-sectional illustration of one embodiment of an electromagnetic actuator according to the invention perpendicularly to a bearing axis A, of the kind that can be used, for example, in a tilting armature valve according to FIG. 1.

Components that are the same, have the same action or are similar are denoted by the same reference signs in FIGS. 1-6.

The bearing axis A is arranged parallel to one end of a coil former 328. The end 328a lies in a plane which may be aligned approximately at a right angle to the longitudinal axis 137 of the coil core 135.

FIG. 3 shows a left-hand part of the coil core 135, which has a central recess, into which the return spring 195 is inserted. The return spring 195 is configured to preload the armature body 115 into an initial position when the electromagnetic actuator 105 is not energized. In connection with FIG. 1, this means that the armature body 115 is preloaded into the first position 147. The coil former 328 is arranged on a radial outer surface of the coil core 135. In that part of the coil former 328 which is illustrated here, a sealing ring receiving space 189 is formed, which is arranged in the form of an encircling depression or recess in a radial outer side of the coil former 328. In the sealing ring receiving space 189 there is, for example, a sealing element 190, in particular an O-ring, which interacts with the housing 170 surrounding the coil former 328, ensuring that passage of fluid between a region in which the armature body 115 is positioned and a region in which the coil 140 is positioned is avoided.

The coil former 328 has a second bearing section 302 of the bearing assembly 300. However, the bearing section 302 could in principle also be arranged on some other element of the actuator 105, e.g. on a housing part of the housing 170 or a separate element (cf. plastic element 165 in FIG. 1A) on one end of the coil former 328. At least two elevations 320a and 320b are formed in the second bearing section 302, although only one first one of the elevations 320a is shown in cross section in FIG. 3. According to one embodiment, the armature body 115 is supported on one side on the actuator 105, as illustrated. In particular, the bearing assembly 300 is situated at one end of the armature 115, and therefore in a radially outer region of the armature 115.

In the exemplary embodiment, the elevations 320a and 320b are formed integrally with the coil former 328. Alternatively, it is also possible for the second bearing section 302 to be arranged by its elevations 320a and 320b on some other element of a coil assembly or the housing, which can be arranged between the coil former 328 and the armature body 115, e.g. an element which has the depression 165 in FIG. 1A. In other words, the elevations 320a and 320b are formed on a component that is nearest, starting from the armature body 115, in the direction of the coil 140. It is likewise possible for the elevations 320a and 320b to be retrofitted, even if the integral design is to be preferred.

The elevations 320a and 320b are embodied in the form of at least two elevations 320a and 320b which are arranged at a distance from one another in the direction of the bearing axis A of the armature body 115 and are of at least partly cylindrical design. The cylindrical part of the elevations 320a and 320b is arranged on a respective columnar section 322a and 322b extending from one end of the coil former 328, and therefore the cylindrical part of the elevations 320a and 320b does not end directly at an end 328a of the coil former 328 but first of all merges into the columnar section 322a and 322b. The columnar section 322a and 322b forms a transition from the cylindrical part of the elevations 320a and 320b to the end 328a of the coil former 328. Situated between the elevations 320a and 320b in the direction of the bearing axis A there is a coil former section 323 which, for example, lies in the plane in which the end 328a of the coil former 328 is also arranged. The columnar sections 322a and 322b can optionally be provided in the electromagnetic actuator 105.

The elevations 320a and 320b are flattened out of the cylindrical shape in a respective region 333a and 333b, respectively, between two tangential lines of contact 331 and 332. In particular, the flattened regions 333a, 333b can be formed parallel to the end 328a of the coil former 328 or an end of a coil assembly element provided with the elevations 320a, 320b. In the flattened region 333a, 333b, the respective elevation 320a and 320b is not in contact with a corresponding depression 310a and 310b of a first bearing section 301 of the bearing assembly 300. This flattened region 333a, 333b serves the purpose of robustness over a tolerance range of the bearing assembly and prevents a large bearing play since it is not a highest point that comes into contact with the respective depression 310a and 310b but two points (on the tangential lines of contact or linear contacts 331 and 332) on a circular arc at a tangential angle to one another.

The elevations 320a and 320b of the second bearing section 302 interact with the depressions 310a and 310b of the first bearing section 301. The depressions 310a and 310b and the first bearing section 301 are formed in a radially outer (end) region on the armature body 115. The depressions 310a and 310b are integrated in the armature body 115 and are embodied in the form of at least two depressions which are arranged at a distance from one another in the direction of the bearing axis A of the armature body 115 and are of at least partly cylindrical bowl-type design. In other words, the depressions 310a and 310b and the elevations 320a and 320b are configured so that they interact in the installed state and together form the bearing assembly 300. A surface section 317 of a surface 315a of the armature body 115 is arranged between the depressions 310a, 310b when viewed in the direction of the bearing axis A. This surface section 317 serves to separate the depressions 310a, 310b spatially along the bearing axis A.

The inclination of the side walls of the depressions 310a, 310b is dependent on a desired armature stroke angle and should be chosen so that self-locking takes effect when a transverse force on the armature body 115 occurs, and therefore prevents the armature body 115 from being lifted out from the elevations 320a, 320b.

For the purposes of the present invention, an at least partly cylindrical shape entails that, in particular, there is at least a partial area which has a cylindrical shape or a partly cylindrical shape (e.g. part of a cylindrically shaped lateral surface). The elevations are not necessarily embodied as "pure" cylinders. It is sufficient if a partial region of their surface has a shape of a cylindrically shaped lateral surface. A similar statement applies to the depressions of at least partly cylindrical bowl-type design.

In FIG. 3, the armature body 115 is arranged so that the surface 315*a* of the armature body 115 faces the end 328*a* of the coil former 328. The armature body 115 also has an opposite surface 315*b*, which faces away from the coil former 328 and thus also from the second bearing section 302. The cover shell 130 (or some other housing part of the housing 170), for example, is arranged opposite the surface 315*b* of the armature body 115. Formed on a surface facing the armature body 115 is a supporting element 131, which is situated opposite the surface 315*b* of the armature body 115, in particular opposite a bulge 340*a* formed by the depression 310*a*. The supporting element 131 can be used to provide a structural arrangement (means) of preventing the armature body 115 from slipping off the coil former 328 and thus a pivoting movement of the armature body 115 no longer being possible, and an "emergency functionality" is thereby enabled. In other words, the supporting element 131 can be used to prevent the depressions 310*a*, 310*b* from slipping off the elevations 320*a*, 320*b*. As an alternative, it is also possible for the cover shell 130 to be configured without a supporting element 131.

The bearing assembly 300, which does not require a needle bearing and axial guidance of the needle bearing by a spring, is a structurally simple option for a reliable and low-wear bearing assembly. This makes it possible to dispense with a complex spring. By the two depressions 310*a*, 310*b* in combination with the two elevations 320*a*, 320*b*, it is possible to fix two axis directions, and it is possible to dispense with axial guidance by the spring 120. By the bearing assembly 300, it is possible to implement support with advantageous centering along the bearing axis A, resulting in lower magnetic transverse forces and thus less bearing wear. It is furthermore advantageous in respect of simpler production that the depressions 310*a*, 310*b* can be integrated and shaped into the armature body 115.

By virtue of the configuration of the bearing assembly 300, the armature body 115 can be supported without play, even without the necessity of a spring 120. It is merely that, with the spring 120, even more advantageous fixing of the armature body 115 on the coil former 328 is possible. By the supporting element 131, it is additionally possible to safeguard against failure of the spring 120 if the spring 120 is used in the electromagnetic actuator 105. A large depth of penetration of the elevations 320*a*, 320*b* into the depressions 310*a*, 310*b* prevents the armature body 115 from popping out of the guide of the bearing assembly 300 and ensures an emergency functionality of the electromagnetic actuator 105.

FIG. 4 shows a schematic enlarged cross-sectional illustration of the bearing assembly 300, wherein a section plane runs along the bearing axis A. In FIG. 4, the arrangement of the depressions 310*a* and 310*b* relative to the respective elevations 320*a* and 320*b* is illustrated. The depressions 310*a* and 310*b* advantageously have an end face 311*a*, 311*b* of spherical design closer to the respective other depression 310*a* and 310*b*. As an alternative, the end faces 311*a* and 311*b* can also be of flattened design. The end face 314*b* of the depression 310*b* which is remote from the end face 311*b* extends approximately at a right angle to the surface 315*a* of the armature body 115. The end face 314*a* of the depression 310*a* which is remote from the end face 311*a* likewise extends approximately at a right angle to the surface 315*a* of the armature body 115.

The elevations 320*a* and 320*b* each likewise have an end face 321*a* and 321*b* of spherical design, which face one another. As an alternative, the end faces 321*a* and 321*b* can also be of at least partly flattened design. End faces configured in this way also contribute to axial centering of the bearing assembly along the bearing axis A.

For the purposes of this disclosure, a surface of spherical design entails, in particular, that there is at least one partial surface which has a three-dimensionally curved, in particular outwardly curved (convex), shape, in particular a spherical or a partly spherical shape (e.g. part of a spherically shaped surface). Here, it is more the spatially/three-dimensionally curved or rounded aspect which is of significance without necessarily requiring an exact circular arc shape for instance, although this may also have specific advantages in respect of axial centering. Accordingly, elliptical or other spatially or three-dimensionally rounded or curved shapes, for example, should also be included in this term. The end faces are not necessarily embodied as "pure" spherical surfaces. It is sufficient if a partial region of their surface has a three dimensionally curved shape. A similar statement applies to the corresponding end faces on the depressions, which correspondingly have a three-dimensionally curved, in particular inwardly curved (concave), in particular spherical shape. It is also possible, in the case of a flattened surface, for correspondingly straight (planar) surfaces (without a curved component) to be provided which form part of the relevant surface.

The described configurations of the depressions 310*a* and 310*b* and of the elevations 320*a* and 320*b* allow largely play-free support of the armature body 115 on the coil former 328. This allows low wear and has a positive effect on the durability of the electromagnetic actuator 105. Moreover, this configuration allows axial alignment along the bearing axis A, thereby making it possible to absorb transverse forces too without significantly restricting the functionality of the electromagnetic actuator 105.

FIG. 5 shows an enlarged perspective illustration of one of the elevations, in this case elevation 320*b* of the bearing assembly 300 of the electromagnetic actuator 105. As already described, the elevation 320*b* extends away from the end 328*a* of the coil former 328. First of all, a columnar section 322*b* follows in a continuous manner, i.e. with a curved transition, in the direction of extent from the end 328*a* of the coil former 328. Extending from the columnar section 322*b* there are a substantially cylindrical part 313*b* of the elevation 320*b* in a right-hand region of the elevation 320*b* and a spherical part of the elevation 320*b* in a left-hand region of the elevation 320*b*. The spherical part of the elevation 320*b* has an end face 321*b* of spherical design, which merges into a flattened region 333*b* in the cylindrical part 313*b* of the elevation 320*b* at the end of the elevation 320*b* remote from the end 328*a*. The embodiments in respect of the elevation 320*b* also apply in an analogous (mirror-inverted) form to the oppositely situated elevation 320*a* (not illustrated here). The lateral surface of the elevations 320*a*, 320*b* is therefore embodied on the principle of a spherical roller bearing in the cylindrical part 313*b*.

FIG. 6 shows an enlarged perspective illustration of an armature body 115 with depressions 310*a* and 310*b*, arranged in the armature body 115, of the bearing assembly 300. As described above, the spring fastening section 196 interacts with the return spring 195. In the exemplary embodiment under consideration, the end faces 311*a* and 311*b* which lie opposite one another along the bearing axis A in the armature body 115 are of spherical design. As an alternative, the end faces 311*a* and 311*b* can also be configured to be flattened out of a cylindrical shape. The end faces 311*a*, 311*b* adjoin a respective, substantially cylindrical part 312*a*, 312*b* (similarly to the elevations).

An electromagnetic actuator according to one aspect of the invention thus provides a bearing concept having an at least partly cylindrical sliding bearing with a centrally situated interruption as an axial fixing. This concept can be used in an advantageous way particularly with tilting- and/or pivoted-armature electromagnetic devices. By virtue of the curved depressions, the support also presents an increased magnetic resistance which lengthens the path length of the magnetic flux, thereby directing the magnetic flux into regions with a longer lever arm (relative to the bearing assembly 300), and the force acting on the armature is thus increased.

The bearing sockets, in this case the depressions, are integrated into the armature body and are in the form of two axially arranged, spaced, at least partly cylindrical half-shells, and therefore there may be a minimal distance between the two depressions. The respective end face which is closer to the other bearing socket can be of spherical and/or flattened design. These can serve for bearing center-ing in the axial direction. The at least partly cylindrical bearing blocks, in this case the elevations 320a and 320b, can be inserted into the nearest component or element in the direction of the coil 140, e.g. into the coil former 328. The shape corresponds approximately to an inverted shape of the bearing sockets, in particular two elevations shaped at least partly as half-cylinders in an axial arrangement, with spheri-cally or flattened facing end faces. In addition, the elevations can be flattened on an uppermost surface facing the depres-sions (and therefore at the uppermost tangential lines of contact or linear contacts). This serves the purpose of robustness over a tolerance range and prevents a large bearing play since it is not a highest point that comes into contact with the depression. This makes the support play-free in a certain way, and the components adapt more quickly to one another.

LIST OF REFERENCE SIGNS 100 tilting armature valve
105 electromagnetic actuator
110 coil element
115 armature body
120 spring
125 sealing element
128 coil former
130 cover shell
131 supporting element
135 coil core
137 longitudinal axis
140 coil
145 bearing
147 first position
149 second position
150 valve seat
155 outlet
157 inlet
158 fluid
160, 160a elevation
162 bearing section
165 recess
170 housing
180 field lines
sealing ring receiving space 189
190 sealing element
195 return spring
196 spring fastening section
300 bearing assembly

12

301 first bearing section
302 second bearing section
310a, b depression
311a, b end face
312a, 312b cylindrical part
cylindrical part 313b
314a, b end face
315a, b surface
317 surface section
320a, b elevation
321a, b end face
322a, b columnar section
323 coil former section
328 coil former
328a end face
331 tangential line of contact
332 tangential line of contact
333a, b flattened region
340a bulge

The invention claimed is:

1. An electromagnetic actuator, comprising:
a coil assembly with at least one coil core and a coil, which is arranged circumferentially around the coil core;
a movable magnetic armature body as a movable actuator element, which can be moved by a magnetic field generated by the coil assembly, wherein the armature body is supported by a bearing assembly and can be moved from a first position into a second position,
wherein the bearing assembly has:
at least two depressions in a first bearing section, which is formed on the armature body, wherein the depres-sions are integrated into the armature body and are arranged at a distance from one another in the direction of a bearing axis of the armature body and are of at least partly cylindrical bowl-type design, and
at least two elevations in a second bearing section, which is formed on the actuator on the same side as the coil assembly, wherein the elevations are arranged at a distance from one another in the direction of the bearing axis of the armature body and are of at least partly cylindrical design and each of which engages in one of the depressions;
wherein one of the elevations and one of the depressions in each case are in contact at two lines of contact tangential to the respective surface and running in the direction of the bearing axis of the armature body;
wherein the elevations are each flattened out of the cylindrical shape in a region between the tangential lines of contact, and are not in contact in the flattened region with the respective depression.

2. The electromagnetic actuator of claim 1, wherein one of the elevations and one of the depressions in each case have different surface radii in respective regions of the tangential lines of contact.

3. The electromagnetic actuator of claim 1, wherein, in the axial direction of the depressions, an axis of symmetry of the depressions is arranged below a surface of the armature body which adjoins the depressions.

4. The electromagnetic actuator of claim 1, further com-prising:
a spring element for pressing the armature body against the second bearing section, wherein the spring element includes a leaf spring, a leg spring or a bent wire element.

5. The electromagnetic actuator of claim 4, wherein, in the first position, the spring element presses the armature body against the second bearing section and holds it in position.

6. The electromagnetic actuator of claim 1, further comprising:

at least one supporting element, which is arranged on an opposite side of the armature body from the coil assembly, opposite the depressions, and supports the armature body when the armature body drops away from the elevations.

7. The electromagnetic actuator of claim 1, wherein the armature body includes a plate armature.

8. The electromagnetic actuator of claim 1, wherein the electromagnetic actuator includes an electromagnetic switching or valve device having the armature body as a switching or valve element, the electromagnetic switching or valve device being configured as an electromechanical relay or solenoid valve.

9. The electromagnetic actuator of claim 1, wherein the electromagnetic actuator includes a tilting armature valve.

10. The electromagnetic actuator of claim 1, wherein the electromagnetic actuator includes a solenoid valve for a pressure control module in a vehicle.

11. An electromagnetic actuator, comprising:

a coil assembly with at least one coil core and a coil, which is arranged circumferentially around the coil core;

a movable magnetic armature body as a movable actuator element, which can be moved by a magnetic field generated by the coil assembly, wherein the armature body is supported by a bearing assembly and can be moved from a first position into a second position, wherein the bearing assembly has:

at least two depressions in a first bearing section, which is formed on the armature body, wherein the depressions are integrated into the armature body and are arranged at a distance from one another in the direction of a bearing axis of the armature body and are of at least partly cylindrical bowl-type design, and at least two elevations in a second bearing section, which is formed on the actuator on the same side as the coil assembly, wherein the elevations are arranged at a distance from one another in the direction of the bearing axis of the armature body and are of at least partly cylindrical design and each of which engages in one of the depressions;

wherein at least one of the depressions is configured so that an end face of the at least one of the depressions which is closer to the respective other depression is of an arched or spherical configuration or configured to be flattened out of the cylindrical bowl-type shape.

12. The electromagnetic actuator of claim 11, wherein the bearing centers along the bearing axis which is brought about by the end face of the at least one of the depressions in interaction with the respective elevation.

13. An electromagnetic actuator, comprising:

a coil assembly with at least one coil core and a coil, which is arranged circumferentially around the coil core;

a movable magnetic armature body as a movable actuator element, which can be moved by a magnetic field generated by the coil assembly, wherein the armature body is supported by a bearing assembly and can be moved from a first position into a second position, wherein the bearing assembly has:

at least two depressions in a first bearing section, which is formed on the armature body, wherein the depressions are integrated into the armature body and are arranged at a distance from one another in the direction of a bearing axis of the armature body and are of at least partly cylindrical bowl-type design, and at least two elevations in a second bearing section, which is formed on the actuator on the same side as the coil assembly, wherein the elevations are arranged at a distance from one another in the direction of the bearing axis of the armature body and are of at least partly cylindrical design and each of which engages in one of the depressions;

wherein at least one of the elevations is configured so that an end face of the at least one of the elevations which is closer to the respective other elevation is of an arched or spherical configuration or configured to be flattened out of the cylindrical shape.

14. The electromagnetic actuator of claim 13, wherein the bearing centers along the bearing axis which is brought about by the end face of the at least one of the elevations in interaction with the respective depression.

15. An electromagnetic actuator, comprising:

a coil assembly with at least one coil core and a coil, which is arranged circumferentially around the coil core;

a movable magnetic armature body as a movable actuator element, which can be moved by a magnetic field generated by the coil assembly, wherein the armature body is supported by a bearing assembly and can be moved from a first position into a second position, wherein the bearing assembly has:

at least two depressions in a first bearing section, which is formed on the armature body, wherein the depressions are integrated into the armature body and are arranged at a distance from one another in the direction of a bearing axis of the armature body and are of at least partly cylindrical bowl-type design, and at least two elevations in a second bearing section, which is formed on the actuator on the same side as the coil assembly, wherein the elevations are arranged at a distance from one another in the direction of the bearing axis of the armature body and are of at least partly cylindrical design and each of which engages in one of the depressions;

wherein the elevations have a depth of penetration into the depressions such that the bearing axis is arranged deeper than a surface of the armature body outside the depressions.

\* \* \* \* \*